United States Patent
Wang et al.

(10) Patent No.: US 12,503,732 B2
(45) Date of Patent: Dec. 23, 2025

(54) DIAGNOSTIC MARKER OF MILD COGNITIVE IMPAIRMENT (MCI) DUE TO ALZHEIMER'S DISEASE (AD) AND USES THEREOF

(71) Applicant: SHANGHAI MENTAL HEALTH CENTER (SHANGHAI PSYCHOLOGICAL COUNSELLING TRAINING CENTER), Shanghai (CN)

(72) Inventors: Tao Wang, Shanghai (CN); Shifu Xiao, Shanghai (CN); Haining He, Shanghai (CN)

(73) Assignee: SHANGHAI MENTAL HEALTH CENTER (SHANGHAI PSYCHOLOGICAL COUNSELLING TRAINING CENTER), Shanghai (CN)

( * ) Notice: Subject to any disclaimer, the term of this patent is extended or adjusted under 35 U.S.C. 154(b) by 943 days.

(21) Appl. No.: 17/271,782

(22) PCT Filed: Jul. 12, 2019

(86) PCT No.: PCT/CN2019/095667
§ 371 (c)(1),
(2) Date: Feb. 26, 2021

(87) PCT Pub. No.: WO2020/063034
PCT Pub. Date: Apr. 2, 2020

(65) Prior Publication Data
US 2021/0340624 A1 Nov. 4, 2021

(30) Foreign Application Priority Data
Sep. 26, 2018 (CN) .......................... 201811126537.7

(51) Int. Cl.
*C12Q 1/6883* (2018.01)
*C12Q 1/686* (2018.01)

(52) U.S. Cl.
CPC .......... *C12Q 1/6883* (2013.01); *C12Q 1/686* (2013.01); *C12Q 2600/158* (2013.01); *C12Q 2600/178* (2013.01)

(58) Field of Classification Search
CPC .................. C12Q 1/6883; C12Q 1/686; C12Q 2600/158; C12Q 2600/178; C12Q 2600/166
See application file for complete search history.

(56) References Cited

U.S. PATENT DOCUMENTS 8,574,838 B2 * 11/2013 Zhang .................. C12Q 1/6806
536/23.1
11,149,313 B2 * 10/2021 Umansky ............. C12Q 1/6883
(Continued)

FOREIGN PATENT DOCUMENTS

| CN | 104480106 A | 4/2015 |
| CN | 105648088 A | 6/2016 |

(Continued)

OTHER PUBLICATIONS

Kumaran et al., "Breast cancer associated germline structural variants harboring small noncoding RNAs impact post-transcriptional gene regulation," Scientific Reports, vol. 8, p. 1-11. (Year: 2018).*
(Continued)

*Primary Examiner* — Angela M. Bertagna
*Assistant Examiner* — Francesca Filippa Giammona
(74) *Attorney, Agent, or Firm* — MaxGoLaw PLLC (57) ABSTRACT

Diagnostic markers for mild cognitive impairment (MCI) due to Alzheimer's disease (AD) are provided. The marker being plasma miRNA including hsa-miR-1185-2-3p, hsa-miR-22-5p, hsa-miR-134-3p, hsa-miR-1909-3p and hsa-miR-107. The use of the marker and the corresponding kits are also provided. The beneficial effects are as follows: biomarkers with high diagnostic value for MCI due to AD are disclosed, which breaks through the dilemma of no (Continued)

convenient peripheral plasma diagnostic markers for MCI due to AD, and is conducive to the early diagnosis and early intervention of Alzheimer's disease, commonly known as senile dementia.

3 Claims, 3 Drawing Sheets

Specification includes a Sequence Listing.

(56) References Cited

U.S. PATENT DOCUMENTS

| | | | | |
|---|---|---|---|---|
| 2016/0022840 A1* | 1/2016 | Chakraborty | ........ | A61K 38/193 536/23.1 |
| 2018/0202997 A1 | 7/2018 | Lee et al. | | |

FOREIGN PATENT DOCUMENTS

| | | | | |
|---|---|---|---|---|
| CN | 108277271 A | | 7/2018 | |
| CN | 109055541 A | | 12/2018 | |
| EP | 3269823 A1 * | | 1/2018 | ............... C12Q 1/68 |
| WO | 2015073972 A1 | | 5/2015 | |
| WO | 2016186360 A1 | | 11/2016 | |
| WO | WO-2017186719 A1 * | | 11/2017 | ........... C12Q 1/6883 |

OTHER PUBLICATIONS

Chen et al., "Reproducibility of quantitative RT-PCR array in miRNA expression profiling and comparison with microarray analysis," BMC Genomics, vol. 10, pp. 1-10. (Year: 2009).*

Zhang et al., "A circulating miRNA signature as a diagnostic biomarker for non-invasive early detection of breast cancer," Breast Cancer Res Treat, vol. 154, pp. 423-434. (Year: 2015).*

Int'l Search Report for PCT/CN2019/095667, dated Oct. 17, 2019.

Sheinerman. K. S. et al. "Plasma MicroRNA Biomarkers for Detection of Mild Cognitive Impairment", Aging, vol. 4, No. 9, Sep. 30, 2012 (Sep. 30, 2012), p. 590, the abstract.

Wang, Tao et al., "The Feasibility of Utilizing Plasma MiRNA107 and BACE1 Messenger RNA Gene Expression for Clinical Diagnosis of Amnestic Mild Cognitive Impairment," J. Clin. Psychiatry, vol. 76, No. 2, Feb. 28, 2015 (Feb. 28, 2015), p. 135, the abstract.

Wang, Xiaolin et al., "Biomarkers of Alzheimer's Disease and Their Applications in the Development of New Drugs," Progress in Pharmaceutical Sciences, vol. 40, No. 8, Aug. 31, 2016 (Aug. 31, 2016), pp. 566 and 567, section 2.4.

Stephan Persengiev, et al., "Insights on the functional interactions between miRNAs and copy number variations in the aging brain," Frontiers in Molecular Neuroscience, Oct. 2013, vol. 6, Art 32, pp. 1-8.

* cited by examiner

SEQUENCE LISTING

<160> NUMBER OF SEQ ID NOS: 27

<210> SEQ ID NO 1
<211> LENGTH: 55
<212> TYPE: DNA
<213> ORGANISM: Artificial sequence
<220> FEATURE:
<223> OTHER INFORMATION: Synthetic construct

<400> SEQUENCE: 1
gtcgtatcca gtgcgtgtcg tggagtcggc aattgcactg gatacgacct acctg        55

<210> SEQ ID NO 2
<211> LENGTH: 54
<212> TYPE: DNA
<213> ORGANISM: Artificial sequence
<220> FEATURE:
<223> OTHER INFORMATION: synthetic sequence

<400> SEQUENCE: 2
gtcgtatcca gtgcgtgtcg tggagtcggc aattgcactg gatacgactt ggtg         54

<210> SEQ ID NO 3
<211> LENGTH: 55
<212> TYPE: DNA
<213> ORGANISM: Artificial sequence

```
<220> FEATURE:
<223> OTHER INFORMATION: synthetic sequence

<400> SEQUENCE: 3
gtcgtatcca gtgcgtgtcg tggagtcggc aattgcactg gatacgacca atcag        55

<210> SEQ ID NO 4
<211> LENGTH: 54
<212> TYPE: DNA
<213> ORGANISM: Artificial sequence
<220> FEATURE:
<223> OTHER INFORMATION: synthetic sequence

<400> SEQUENCE: 4
gtcgtatcca gtgcgtgtcg tggagtcggc aattgcactg gatacgacta aagc         54

<210> SEQ ID NO 5
<211> LENGTH: 56
<212> TYPE: DNA
<213> ORGANISM: Artificial sequence
<220> FEATURE:
<223> OTHER INFORMATION: synthetic sequence

<400> SEQUENCE: 5
gtcgtatcca gtgcgtgtcg tggagtcggc aattgcactg gatacgaccg gtgagc       56

<210> SEQ ID NO 6
<211> LENGTH: 55
<212> TYPE: DNA
<213> ORGANISM: Artificial sequence
<220> FEATURE:
<223> OTHER INFORMATION: synthetic sequence

<400> SEQUENCE: 6
gtcgtatcca gtgcgtgtcg tggagtcggc aattgcactg gatacgacat gagag        55

<210> SEQ ID NO 7
<211> LENGTH: 54
<212> TYPE: DNA
<213> ORGANISM: Artificial sequence
<220> FEATURE:
<223> OTHER INFORMATION: synthetic sequence

<400> SEQUENCE: 7
gtcgtatcca gtgcgtgtcg tggagtcggc aattgcactg gatacgacac tttc         54

<210> SEQ ID NO 8
<211> LENGTH: 54
<212> TYPE: DNA
<213> ORGANISM: Artificial sequence
<220> FEATURE:
<223> OTHER INFORMATION: synthetic sequence

<400> SEQUENCE: 8
gtcgtatcca gtgcgtgtcg tggagtcggc aattgcactg gatacgacgc tttc         54

<210> SEQ ID NO 9
<211> LENGTH: 54
<212> TYPE: DNA
<213> ORGANISM: Artificial sequence
<220> FEATURE:
<223> OTHER INFORMATION: synthetic sequence

<400> SEQUENCE: 9
gtcgtatcca gtgcgtgtcg tggagtcggc aattgcactg gatacgactg atag         54
```

```
<210> SEQ ID NO 10
<211> LENGTH: 18
<212> TYPE: DNA
<213> ORGANISM: Artificial sequence
<220> FEATURE:
<223> OTHER INFORMATION: synthetic sequence

<400> SEQUENCE: 10
ggcaaagtgc tgttcgtg                                                 18

<210> SEQ ID NO 11
<211> LENGTH: 18
<212> TYPE: DNA
<213> ORGANISM: Artificial sequence
<220> FEATURE:
<223> OTHER INFORMATION: synthetic sequence

<400> SEQUENCE: 11
cagtgcgtgt cgtggagt                                                 18

<210> SEQ ID NO 12
<211> LENGTH: 20
<212> TYPE: DNA
<213> ORGANISM: Artificial sequence
<220> FEATURE:
<223> OTHER INFORMATION: synthetic sequence

<400> SEQUENCE: 12
gaacctgtgg gccacctagt                                               20

<210> SEQ ID NO 13
<211> LENGTH: 18
<212> TYPE: DNA
<213> ORGANISM: Artificial sequence
<220> FEATURE:
<223> OTHER INFORMATION: synthetic sequence

<400> SEQUENCE: 13
gtgcgtgtcg tggagtcg                                                 18

<210> SEQ ID NO 14
<211> LENGTH: 18
<212> TYPE: DNA
<213> ORGANISM: Artificial sequence
<220> FEATURE:
<223> OTHER INFORMATION: synthetic sequence

<400> SEQUENCE: 14 gggggggtagg cagtgtca                                                18

<210> SEQ ID NO 15
<211> LENGTH: 18
<212> TYPE: DNA
<213> ORGANISM: Artificial sequence
<220> FEATURE:
<223> OTHER INFORMATION: synthetic sequence

<400> SEQUENCE: 15
gtgcgtgtcg tggagtcg                                                 18

<210> SEQ ID NO 16
<211> LENGTH: 20
<212> TYPE: DNA
<213> ORGANISM: Artificial sequence
<220> FEATURE:
<223> OTHER INFORMATION: synthetic sequence
```

<400> SEQUENCE: 16
ggggagttct tcagtggcaa                                               20

<210> SEQ ID NO 17
<211> LENGTH: 18
<212> TYPE: DNA
<213> ORGANISM: Artificial sequence
<220> FEATURE:
<223> OTHER INFORMATION: synthetic sequence

<400> SEQUENCE: 17
gtgcgtgtcg tggagtcg                                                 18

<210> SEQ ID NO 18
<211> LENGTH: 16
<212> TYPE: DNA
<213> ORGANISM: Artificial sequence
<220> FEATURE:
<223> OTHER INFORMATION: synthetic sequence

<400> SEQUENCE: 18
aacgcagggg ccgggt                                                   16

<210> SEQ ID NO 19
<211> LENGTH: 18
<212> TYPE: DNA
<213> ORGANISM: Artificial sequence
<220> FEATURE:
<223> OTHER INFORMATION: synthetic sequence

<400> SEQUENCE: 19
gtgcgtgtcg tggagtcg                                                 18

<210> SEQ ID NO 20
<211> LENGTH: 20
<212> TYPE: DNA
<213> ORGANISM: Artificial sequence
<220> FEATURE:
<223> OTHER INFORMATION: synthetic sequence

<400> SEQUENCE: 20
ggggaatata caggggggaga                                              20

<210> SEQ ID NO 21
<211> LENGTH: 18
<212> TYPE: DNA
<213> ORGANISM: Artificial sequence
<220> FEATURE:
<223> OTHER INFORMATION: synthetic sequence

<400> SEQUENCE: 21
gtgcgtgtcg tggagtcg                                                 18

<210> SEQ ID NO 22
<211> LENGTH: 22
<212> TYPE: DNA
<213> ORGANISM: Artificial sequence
<220> FEATURE:
<223> OTHER INFORMATION: synthetic sequence

<400> SEQUENCE: 22 gggggggtagt taatgaatcc tg                                           22

<210> SEQ ID NO 23

```
<211> LENGTH: 18
<212> TYPE: DNA
<213> ORGANISM: Artificial sequence
<220> FEATURE:
<223> OTHER INFORMATION: synthetic sequence

<400> SEQUENCE: 23
gtgcgtgtcg tggagtcg                                                  18

<210> SEQ ID NO 24
<211> LENGTH: 18
<212> TYPE: DNA
<213> ORGANISM: Artificial sequence
<220> FEATURE:
<223> OTHER INFORMATION: synthetic sequence

<400> SEQUENCE: 24
gcttgctctg agctccga                                                  18

<210> SEQ ID NO 25
<211> LENGTH: 18
<212> TYPE: DNA
<213> ORGANISM: Artificial sequence
<220> FEATURE:
<223> OTHER INFORMATION: synthetic sequence

<400> SEQUENCE: 25
gtgcgtgtcg tggagtcg                                                  18

<210> SEQ ID NO 26
<211> LENGTH: 18
<212> TYPE: DNA
<213> ORGANISM: Artificial sequence
<220> FEATURE:
<223> OTHER INFORMATION: synthetic sequence

<400> SEQUENCE: 26
ggagcagcat tgtacagg                                                  18

<210> SEQ ID NO 27

<400> SEQUENCE: 27

000
```

DIAGNOSTIC MARKER OF MILD COGNITIVE IMPAIRMENT (MCI) DUE TO ALZHEIMER'S DISEASE (AD) AND USES THEREOF

INCORPORATION BY REFERENCE TO ANY PRIORITY APPLICATIONS

This application claims priority of the Chinese invention patent application with application number 201811126537.7 filed on Sep. 26, 2018, the contents of which are hereby incorporated by reference.

INCORPORATION BY REFERENCE

The material in the ASCII plain text file named SHD-0318US-rev ST25.TXT', created on Oct. 23, 2024, and containing 44,000 bytes, is incorporated herein by reference.

BACKGROUND OF THE INVENTION

Field of the Invention

The present invention relates to the prodromal phase of Alzheimer's disease, in particular to diagnostic markers, and specifically refers to a diagnostic marker of MCI due to AD and uses thereof.

Description of the Related Art

Alzheimer's disease (AD), commonly known as senile dementia, is a neurodegenerative disease with neurofibrillary tangles as the main pathological feature formed by the disorder of microtubule structure caused by the deposition of amyloid β-protein (Aβ) in the brain and highly phosphorylated Tau protein. AD has become a common, frequently-occurring and high-burden disease in the elderly. AD is a chronic, non-infectious, and age-related neurodegenerative disease caused by complex causes. In the more than 100 years since the German psychiatrist Alzheimer first reported the disease in 1906, the disease has become the most common type of senile dementia from a rare disease, accounting for about 50% to 70%, and it is one of the four major causes of death in an aging society. Epidemiological studies have shown that the prevalence of the elderly over 60 years old is 3 to 5%, and the prevalence doubles for every 5 years old, up to 20% over 80 years old, and up to 50% over 90 years old. According to conservative estimates, there are currently at least 6 million AD patients in China, and there will be more than 10 million patients by 2020. The burden of AD medical and nursing care is very heavy, the direct and indirect medical costs are very high. For example, the average annual medical care cost of each AD patient in the United States is as high as 50,000 US dollars, which is 3 times than that of the elderly without AD. According to statistics, in 2010, the global medical expenditure for dementia was as high as 604 billion US dollars, accounting for 1% of the global gross national product in the same period. With the acceleration of China's aging, especially the increase in the absolute number of elderly people, the medical care and economic burden caused by AD will become more and more severe. Therefore, to actively carry out early prevention, early diagnosis and early treatment of AD to reduce the burden of medical care is a medical and health and socioeconomic issue that must be resolved in an aging society.

In the past 20 years, AD diagnostic research has made great progress. Studies have shown that the use of modern diagnosis and treatment techniques, such as brain senile plaque imaging and cerebrospinal fluid pathological marker detection, can detect neurobiochemical and neuropathological changes in the brain more than 20 years before the appearance of obvious clinical symptoms of AD. However, senile plaque imaging detection is very expensive and has no clinical application in China. At the same time, due to traditional concepts and relatively serious invasive operations, cerebrospinal fluid examination cannot be actually used in clinical early diagnosis. Furthermore, brain structure imaging examination cannot be used for early detection, especially a characteristic change of MCI caused by AD, so there is actually no clinically applicable early diagnosis method of clinical biomarkers in China. In 2011, the newly revised diagnostic criteria (NIA-AA) of the National Institute of Aging and Alzheimer's Association of the United States redefined the pathophysiological process of AD and the clinical symptoms caused by it, and formally determined Preclinical AD, mild cognitive impairment due to AD, and dementia due to AD are three different diagnostic criteria. Epidemiological studies have shown that the prevalence of MCI is about 15% to 17%, 10% to 15% progress to AD every year, and the annual incidence of normal elderly people is about 1%. MCI is a high-risk population for early intervention and the best entry point for early preventive intervention.

In the past 10 years, some therapeutic studies on the pathological mechanism of AD have encountered major setbacks. High-profile drugs including Aβ monoclonal antibodies Bapineuzumab and Solanezumab, and anti-Tau protein drug LMTX III clinical trials have all ended in failure. The above results illustrate the complexity of the pathogenesis of AD, and also suggest that there are huge opportunities in the field of AD pathogenesis research. We have noticed the important role of BACE1 in the pathological splicing process of Aβ. In recent years, studies have found that the deposition of Aβ is much earlier than the onset of dementia symptoms. Our research suggests that abnormal genetic regulation of microRNA (miRNA) is the key link of them. hsa-miR is a type of small single-stranded RNA composed of 19-23 nucleotides in eukaryotes. It belongs to the large family of non-coding RNAs and can regulate important small molecules of gene expression at the post-transcriptional level. It is not only abundant in brain tissue, but also stably exists in cerebrospinal fluid, plasma and serum samples, and play an important role in the development of the nervous system and the formation of synaptic plasticity. hsa-miR is produced from a primary transcript (pri-miRNA), which is processed by RNase III Drosha into a precursor miRNA (pre-miRNA) containing a stem-loop structure, and then under the Dicer (a RNase III), the hairpin-like pre-miRNA is further cleaved in the cytoplasm to produce mature miRNA. These mature miRNAs together with other proteins form the miRNA-protein complex (miRNP). miRNA guides miRNP to reach their target mRNA, and then exerts genetic regulation function.

Studies have shown that the abnormal function of hsa-miR is related to the initiation and progression of the pathological process of AD. The hsa-miR combines with the 3'UTR of the AD target gene to restrict the post-transcriptional expression by restricting translation initiation or cleaving the target gene. Most studies on the regulation and function of hsa-miR in the occurrence and development of AD take the 3' UTR region of β-site APP cleaving enzyme 1 (BACE1) as the target gene site. The results of cadaveric brain studies indicate that the expression changes of certain hsa-miRs are linked to the pathological pathways of Alzheimer's disease through their targets. In addition, studies have found that BACE1, in addition to cleaving APP to perform its enzymatic function, can also destroy other molecules required for the cell to produce protein kinase A (PKA), a protein in the brain that guides cell metabolism, and damage neuronal functions. Especially in recent years, studies have found that the deposition of AB is much earlier than the occurrence of dementia symptoms, which indicates that Aß is not only involved in the development process of AD, but also the seed and inducement of AD. The role of hsa-miR in inducing changes in the expression or activity of BACE1 is particularly prominent. Analysis of RNA in brain tissues of AD patients at different stages revealed that the expression of miRNA107 decreased to varying degrees and the expression of BACE1 increased during the course of AD disease, resulting in corresponding pathological changes. This study suggests that miRNA107 can regulate the expression of BACE1 by binding to the 3'UTR region of the target gene BACE1 mRNA, thereby affecting the production of related proteins. In addition, the research results of different researchers focused on the role of miRNAs such as miRNA124, micRNA15, miRNA195, miRNA19, miRNA298, miRNA328, etc. in the pathogenesis of AD, and believed that these miRNAs also partially regulated the pathogenesis of AD.

Among human biological specimens, blood is one of the samples that is the easiest to obtain, the simplest to operate, the least traumatic, and the patient bears the least risk and pain. Blood is considered to be the most suitable biological sample for screening high-risk populations for AD, early detection, diagnosis, and follow-up of treatment intervention. hsa-miR has been proven to exist in a very stable form in human plasma or serum. Its structure gives it the ability to protect it from the endogenous RNase enzyme activity so that it can be detected and become a stable AD diagnostic plasma marker. The applicant's hsa-miR research results suggest that the expression of several genetic markers hsa-miR in peripheral blood is significantly different between the MCI due to AD and the normal control (Normal Control, NC). The plasma miRNA expression level can be used as a routine method for screening and diagnosing AD to optimize clinical AD diagnosis strategies.

SUMMARY OF THE INVENTION

The purpose of the present invention is to overcome the above-mentioned shortcomings of the prior art, and provide a diagnostic marker for MCI due to AD and uses thereof that can effectively screen and diagnose AD and optimize clinical AD diagnosis strategies.

In order to achieve the above objective, one aspect of the present invention provides a diagnostic marker for MCI due to AD, wherein the marker is plasma miRNA comprising hsa-miR-1185-2-3p, hsa-miR-22-5p, hsa-miR-134-3p, hsa-miR-1909-3p and hsa-miR-107.

The present invention also provides a use of the diagnostic marker for MCI due to AD in the preparation of a diagnostic kit for MCI due to AD.

The present invention also provides a diagnostic kit for MCI due to AD, wherein the kit for measuring the content of hsa-miR-1185-2-3p, hsa-miR-22-5p, hsa-miR-134-3p, hsa-miR-1909-3p and hsa-miR-107 in plasma.

Preferably, the kit comprising primers and probes of hsa-miR-1185-2-3p, hsa-miR-22-5p, hsa-miR-134-3p, hsa-miR-1909-3p, and hsa-miR-107.

Preferably, the kit comprising the internal control has-miR-93-5p.

Preferably, the formula for calculating the content of hsa-miR-1185-2-3p. hsa-miR-22-5p. hsa-miR-134-3p. hsa-miR-1909-3p和 hsa-miR-107 in plasma measured by the kit is:

$$7.341 - 0.029 \times hsa\text{-}miR\text{-}134\text{-}3p - 0.150 \times hsa\text{-}miR\text{-}22\text{-}5p - 0.604 \times hsa\text{-}miR\text{-}1185\text{-}2\text{-}3p - 5.321 \times hsa\text{-}miR\text{-}1909\text{-}3p - 1.372 \times hsa\text{-}miR\text{-}107.$$

A method of using the diagnostic kit for MCI due to AD, wherein comprising the steps of:
(1) extracting total RNA from a sample to be tested;
(2) using a miRNA reverse transcription kit to perform reverse transcription reaction on a extracted total RNA to obtain a corresponding cDNA;
(3) performing real-time fluorescent quantitative PCR with the cDNA, and using has-miR-93-5p as an internal control, detection result is expressed as ΔCt, wherein ΔCt=Ct microRNA-Ct has-miR-93-5p; and
(4) processing the result obtained according to a formula:

$$7.341 - 0.029 \times hsa\text{-}miR\text{-}134\text{-}3p - 0.150 \times hsa\text{-}miR\text{-}22\text{-}5p - 0.604 \times hsa\text{-}miR\text{-}1185\text{-}2\text{-}3p - 5.321 \times hsa\text{-}miR\text{-}1909\text{-}3p - 1.372 \times hsa\text{-}miR\text{-}107,$$

and comparing a calculated value with 0.174.

The beneficial effects of the present invention are: through extensive literature reading and review, on the one hand, screening of markers from published literature that may have the value of early clinical diagnosis and differential diagnosis of MCI due to AD, on the other hand, through rigorous testing and statistical analysis, a biomarker with high diagnostic value for MCI due to AD was discovered for the first time as a combination of five nucleic acid molecules hsa-miR-1185-2-3p, hsa-miR-22-5p, hsa-miR-134-3p, hsa-miR-1909-3p and hsa-miR-107. Through the development and application of microRNA markers and diagnostic kits, it has broken through the dilemma of no convenient peripheral plasma diagnostic markers for MCI due to AD, and is conducive to the early diagnosis and early intervention of Alzheimer's disease commonly known as senile dementia. At the same time, it is hopeful that the discovery of new anti-AD therapeutic drug targets with potential therapeutic value will provide scientific basis and clinical support.

DETAILED DESCRIPTION OF THE PREFERRED EMBODIMENT

In order to be able to describe the technical content of the present invention more clearly, further description will be given below in conjunction with specific embodiments.

Figure 1:
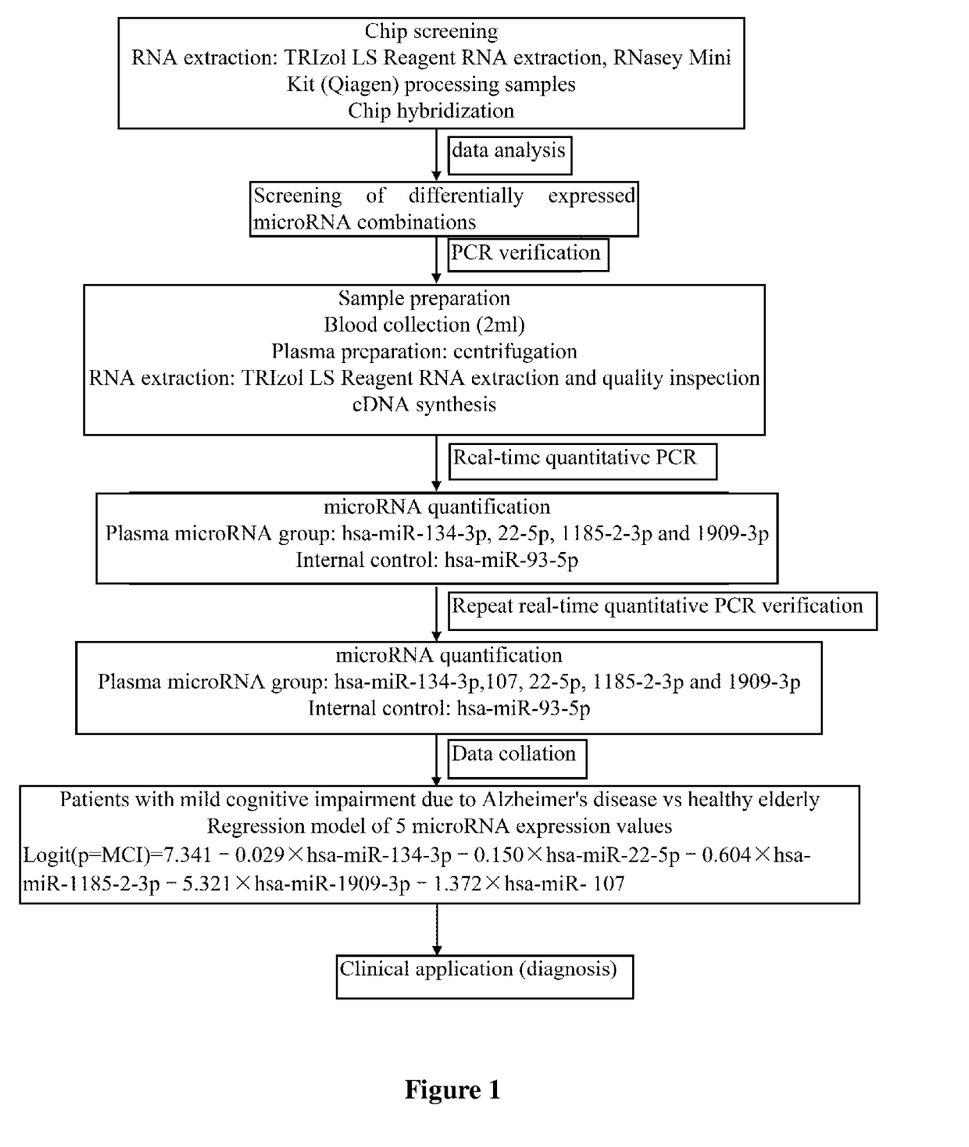
FIG. 1 is a flow chart of the microRNA combinatorial chip screening, training and verification experiment design for identifying target plasma of MCI patients due to AD according to the present invention.
Figure 2:
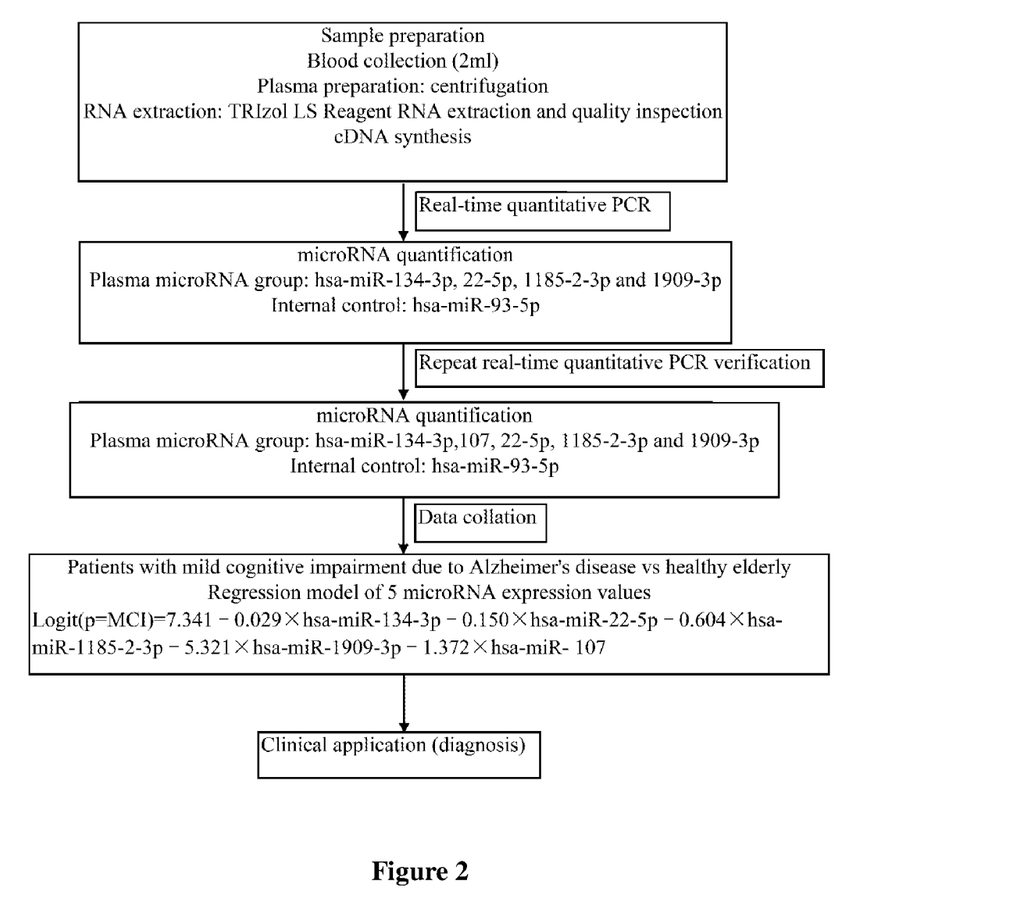
FIG. 2 is a diagram of the main method steps for determining the plasma microRNA combination of patients with MCI due to AD in the diagnosis of the present invention.
Figure 3:
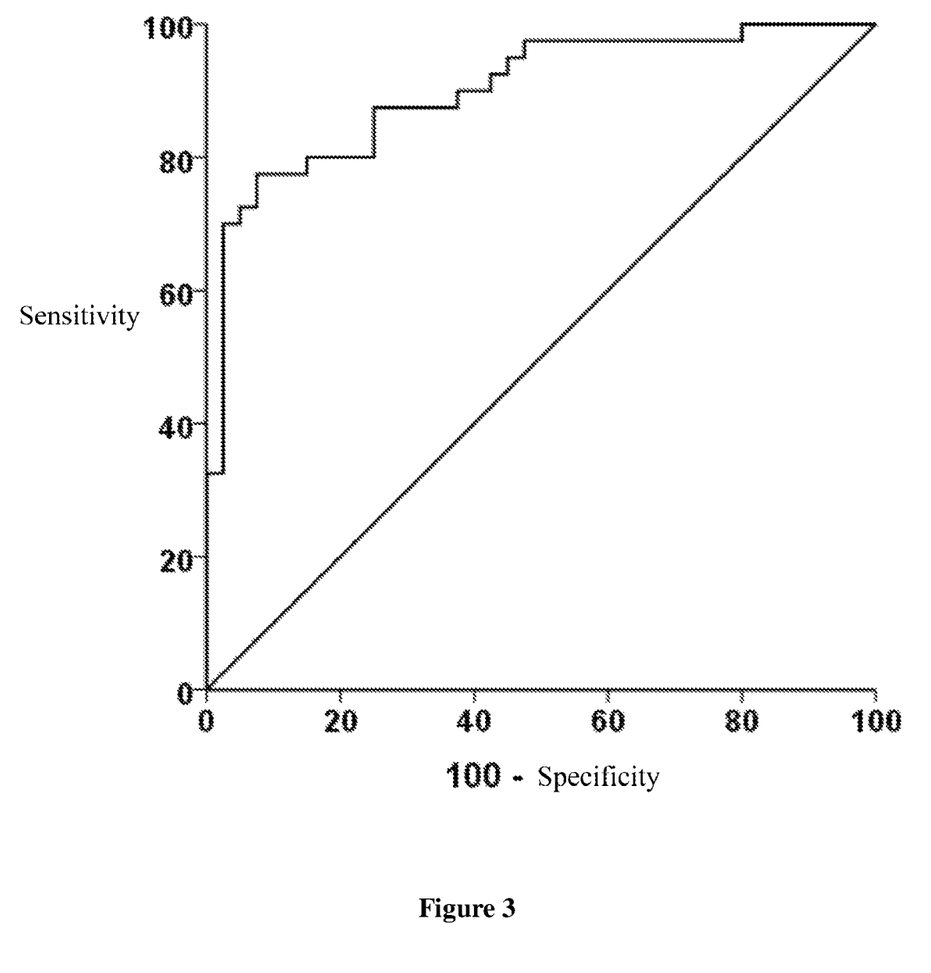
FIG. 3 shows the ROC curve of the logistic regression model, training set and validation set.

With reference to FIGS. 1 to 3, the screening and verification of diagnostic marker for MCI due to AD according to the present invention will be specifically described.

I. Research Object

The subjects were 50 elderly cases of MCI due to AD collected in the communities of Changning District and Xuhui District, Shanghai. The control group was healthy elderly people with matching age, sex, and years of education.

II. Research Method

1. Chip Screening (1) extract RNA using TRIzol method and purify it with RNasey Mini Kit (QIAGEN). Use NanoDrop ND-1000 to measure the purified RNA concentration, and electrophoresis to detect RNA integrity.

(2) After the extracted RNA passes the quality inspection, use the miRCURY™ Array Power Labeling kit (Cat #208032-A, Exiqon) to label the miRNA. After the labeling is completed, hybridize the sample with miR-CURY™ LNA Array (v.19.0) (Exiqon) chip, the total reaction volume is 50 ul (25 ul sample and 25 ul hybridization buffer), denature at 95° C. for 2 minutes, and place on ice for 2 minutes. Hybridize with the chip at 56° C. for 16-20 hours (hybridization system is Nimblegen Systems, Inc, Madison, WI, USA). After the hybridization is completed, use the Wash buffer kit (Exiqon) to clean the chip.

(3) Scan the chip using Axon GenePix 4000B chip scanner.

2. The First Real-Time Quantitative PCR Verification

After chip screening, select microRNAs that are significantly down-regulated compared with the control group for real-time quantitative PCR verification. The specific implementation methods are as follows:

(1) Extract RNA using TRIzol method and purify it with RNasey Mini Kit (QIAGEN). Use NanoDrop ND-1000 to measure the purified RNA concentration.

(2) The extracted RNA undergoes a reverse transcription reaction after quality inspection. The total reaction volume is 20 ul (total RNA 300 ng, reverse transcription specific primer 0.3 ul, RNase inhibitor 0.3 ul, buffer 2 ul, MMLV reverse transcriptase 0.3 ul, dNTP2 ul, nuclease free water is added to 20 ul), reactions were carried out at different temperatures (16° C., 42° C., 85° C.) and different times (30 minutes, 40 minutes, 5 minutes). The reverse transcription specific primer information is shown in Table 1 below:

TABLE 1

MicroRNA reverse transcription specific primer information

| Gene name | RT primer |
|---|---|
| hsa-miR-93-5p | 5'GTCGTATCCAGTGCGTGTCGTGGAGTCGGCAATTGCACTGGATACGACCTACCTG3' (SEQ ID No. 1) |
| hsa-miR-134-3p | 5'GTCGTATCCAGTGCGTGTCGTGGAGTCGGCAATTGCACTGGATACGACTTGGTG3' (SEQ ID No. 2) |
| hsa-miR-34b-5p | 5'GTCGTATCCAGTGCGTGTCGTGGAGTCGGCAATTGCACTGGATACGACCAATCAG3' (SEQ ID No. 3) |
| hsa-miR-22-5p | 5'GTCGTATCCAGTGCGTGTCGTGGAGTCGGCAATTGCACTGGATACGACTAAAGC3' (SEQ ID No. 4) |
| hsa-miR-1909-3p | 5'GTCGTATCCAGTGCGTGTCGTGGAGTCGGCAATTGCACTGGATACGACCGGTGAGC3' (SEQ ID No. 5) |
| hsa-miR-1185-2-3p | 5'GTCGTATCCAGTGCGTGTCGTGGAGTCGGCAATTGCACTGGATACGACATGAGAG3' (SEQ ID No. 6) |
| hsa-miR-569 | 5'GTCGTATCCAGTGCGTGTCGTGGAGTCGGCAATTGCACTGGATACGACACTTTC3' (SEQ ID No. 7) |
| hsa-miR-5691 | 5'GTCGTATCCAGTGCGTGTCGTGGAGTCGGCAATTGCACTGGATACGACGCTTTC3' (SEQ ID No. 8) |
| hsa-miR-107 | 5'GTCGTATCCAGTGCGTGTCGTGGAGTCGGCAATTGCACTGGATACGACTGATAG3' (SEQ ID No. 9) |

(3) The total system of real-time quantitative PCR amplification system is 10 ul, the reaction has 40 cycles, and each reaction is repeated three times. Using hsa-miR-93-5p as an internal control, the test results are expressed as $2^{-\Delta\Delta CT}$, where the smaller the value of $2^{-\Delta\Delta CT}$, the lower the expression level. The primers used for PCR are shown in Table 2 below.

TABLE 2

Primer information for real-time quantitative PCR

| Gene name | Bidirectional primer sequence | Annealing temperature (° C.) | Product length (bp) |
|---|---|---|---|
| hsa-miR-93-5p | GSP: 5'GGCAAAGTGCTGTTCGTG3' (SEQ ID No. 10)<br>R: 5'CAGTGCGTGTCGTGGAGT3' (SEQ ID No. 11) | 60 | 65 |
| hsa-miR-134-3p | GSP: 5'GAACCTGTGGGCCACCTAGT3' (SEQ ID No. 12)<br>R: 5'GTGCGTGTCGTGGAGTCG3' (SEQ ID No. 13) | 60 | 64 |
| hsa-miR-34b-5p | GSP: 5'GGGGGGTAGGCAGTGTCA3' (SEQ ID No. 14)<br>R: 5'GTGCGTGTCGTGGAGTCG3' (SEQ ID No. 15) | 60 | 67 |

TABLE 2-continued

Primer information for real-time quantitative PCR

| Gene name | Bidirectional primer sequence | Annealing temperature (° C.) | Product length (bp) |
|---|---|---|---|
| hsa-miR-22-5p | GSP: 5'GGGGAGTTCTTCAGTGGCAA3' (SEQ ID No. 16) R: 5'GTGCGTGTCGTGGAGTCG3' (SEQ ID No. 17) | 60 | 60 |
| hsa-miR-1909-3p | GSP: 5'AACGCAGGGGCCGGGT3' (SEQ ID No. 18) R: 5'GTGCGTGTCGTGGAGTCG3' (SEQ ID No. 19) | 60 | 62 |
| hsa-miR-1185-2-3p | GSP: 5'GGGGAATATACAGGGGGAGA3' (SEQ ID No. 20) R: 5'GTGCGTGTCGTGGAGTCG3' (SEQ ID No. 21) | 60 | 66 |
| hsa-miR-569 | GSP: 5'GGGGGGTAGTTAATGAATCCTG3' (SEQ ID No. 22) R: 5'GTGCGTGTCGTGGAGTCG3' (SEQ ID No. 23) | 60 | 65 |
| hsa-miR-5691 | GSP: 5'GCTTGCTCTGAGCTCCGA3' (SEQ ID No. 24) R: 5'GTGCGTGTCGTGGAGTCG3' (SEQ ID No. 25) | 60 | 62 |
| hsa-miR-107 | GSP: 5'GGAGCAGCATTGTACAGG3' (SEQ ID No. 26) R: 5'CAGTGCGTGTCGTGGA3' (SEQ ID No. 27) | 60 | 65 |

3. The Second Real-Time Quantitative PCR Verification

After the first real-time quantitative PCR verification, select microRNAs that expression levels were significantly lower than those of the control group, and add hsa-miR-107, which was previously confirmed to have significantly decreased expression levels in Alzheimer's disease populations, for re-verification and the specific implementation method is the same as above.

III. Research Results

During chip screening stage, the expression levels of hsa-miR-134-3p, hsa-miR-34b-5p, hsa-miR-22-5p, hsa-miR-1909-3p, hsa-miR-1185-2-3p, hsa-miR-569 and hsa-miR-5691 in the MCI group are significantly lower than the normal control group. The specific data are shown in Table 3 below:

TABLE 3

Differential levels of microRNA expression in the normal control group (NC) and mild cognitive impairment (MCI) groups

| microRNA name | Fold Change | P Value | FDR |
|---|---|---|---|
| hsa-miR-134-3p | 0.099 | 0.362 | 0.767 |
| hsa-miR-34b-5p | 0.225 | 0.337 | 0.758 |
| hsa-miR-22-5p | 0.369 | 0.039 | 0.635 |
| hsa-miR-1909-3p | 0.311 | 0.006 | 0.592 |
| hsa-miR-1185-2-3p | 0.372 | 0.048 | 0.642 |
| hsa-miR-569 | 0.444 | 0.054 | 0.642 |
| hsa-miR-5691 | 0.374 | 0.016 | 0.598 |

During real-time quantitative PCR verification stage, the expression level of hsa-miR-1185-2-3p, hsa-miR-22-5p, hsa-miR-134-3p, hsa-miR-1909-3p and hsa-miR-107 in the MCI group is significantly lower than the normal control group, the specific data are shown in Table 4:

TABLE 4

MicroRNA expression levels in NC and MCI groups ($2^{-\Delta\Delta CT}$ value)

| | The first time | | | The second time | | |
|---|---|---|---|---|---|---|
| microRNA name | NC group (n = 20) | MCI group (n = 10) | P Value | NC group (n = 40) | MCI group (n = 40) | P Value |
| hsa-miR-134-3p | 1.06 | 0.34 | <0.001 | 1.43 | 1.12 | 0.03 |
| hsa-miR-34b-5p | 0.90 | 0.92 | 0.81 | — | — | — |
| hsa-miR-22-5p | 0.92 | 0.58 | <0.001 | 1.24 | 0.91 | <0.001 |
| hsa-miR-1909-3p | 0.79 | 0.35 | <0.001 | 1.11 | 0.69 | <0.001 |
| hsa-miR-1185-2-3p | 0.89 | 0.16 | <0.001 | 2.17 | 1.37 | <0.001 |
| hsa-miR-569 | 0.92 | 0.67 | <0.001 | — | — | — |
| hsa-miR-5691 | 1.07 | 0.87 | <0.001 | — | — | — |
| hsa-miR-107 | — | — | — | 1.52 | 0.89 | <0.001 |

ROC curve analysis shows that five microRNAs, hsa-miR-1185-2-3p, hsa-miR-22-5p, hsa-miR-134-3p, hsa-miR-1909-3p and hsa-miR-107, as biomarkers have high diagnostic value for MCI due to AD (AUC is 0.901, sensitivity and specificity are 80.00% and 85.00%, respectively).

Using the above five microRNAs as independent variables and the five microRNA joint predicted probabilities as dependent variables, linear fitting is performed to calculate the predicted probability value. The value obtained by the calculation model (calculation model 1) is analyzed again by ROC curve, and the result shows that the value obtained by the calculation model still has a high diagnostic value. The AUC is 0.901, the limit value is 0.174, and the sensitivity and specificity are 80.00% and 82.50%, respectively. The results are shown in Table 5 and Table 6.

TABLE 5

Summary of linear fitting models with five microRNA $2^{-\Delta\Delta CT}$ values as variables

| −2 Log likelihood | Cox & Snell $R^2$ | Nagelkerke $R^2$ |
|---|---|---|
| 64.407 | 0.441 | 0.588 |

TABLE 6

Linear fitting model coefficient table with five kinds of microRNA $2^{-\Delta\Delta CT}$ as variables

| Variable name | Non-standardized coefficient B | Standard error | Wals Value | P Value |
|---|---|---|---|---|
| constant | 7.341 | 1.843 | 15.868 | <0.001 |
| hsa-miR-134-3p | −0.029 | 0.593 | 0.002 | 0.961 |
| hsa-miR-22-5p | −0.150 | 1.321 | 0.013 | 0.909 |
| hsa-miR-1185-2-3p | −0.604 | 0.465 | 1.688 | 0.194 |
| hsa-miR-1909-3p | −5.321 | 1.662 | 10.255 | 0.005 |
| hsa-miR-107 | −1.372 | 0.603 | 5.171 | 0.023 |

The calculation model 1 is:

Logit($p=MCI$)=7.341−0.029×$hsa$-$miR$-134-3$p$−0.150× $hsa$-$miR$-22-5$p$−0.604×$hsa$-$miR$-1185-2-3$p$− 5.321×$hsa$-$miR$-1909-3$p$−1.372×$hsa$-$miR$-107.

Analysis method description: use SPSS 20.0 software package for data analysis. For comparison between the two groups, first perform the homogeneity test of variance. For the two groups of data with homogeneity of variance, use student's t-test for comparative analysis; for uneven variance, the two groups of data were analyzed by Welch correction. $P<0.05$ was considered as statistically significant. Binary Logistic regression is performed on the data with statistical differences to obtain the predicted probability value, and the predicted probability value is used for subsequent ROC curve analysis. ROC curve analysis is used to evaluate the value of microRNA in the diagnosis of MCI due to AD. The closer the area under the curve (AUC) is to 1, the higher the diagnostic value of this indicator.

At present, the biological diagnosis of MCI due to AD relies on the expensive PET-CT examination of cerebral senile plaques without domestic intellectual property rights and the invasive lumbar puncture cerebrospinal fluid examination which is not accepted by traditional concepts. There is no convenient and minimally invasive early diagnosis technology of peripheral plasma examination.

The beneficial effects of the present invention are: through extensive literature reading and review, on the one hand, screening of markers from published literature that may have the value of early clinical diagnosis and differential diagnosis of MCI due to AD, on the other hand, through rigorous testing and statistical analysis, a biomarker with high diagnostic value for MCI due to AD was discovered for the first time as a combination of five nucleic acid molecules hsa-miR-1185-2-3p, hsa-miR-22-5p, hsa-miR-134-3p, hsa-miR-1909-3p and hsa-miR-107. Through the development and application of microRNA markers and diagnostic kits, it has broken through the dilemma of no convenient peripheral plasma diagnostic markers for MCI due to AD, and is conducive to the early diagnosis and early intervention of Alzheimer's disease commonly known as senile dementia. At the same time, it is hopeful that the discovery of new anti-AD therapeutic drug targets with potential therapeutic value will provide scientific basis and clinical support.

In this specification, the present invention has been described with reference to its specific embodiments. However, it is obvious that various modifications and changes can still be made without departing from the spirit and scope of the present invention. Therefore, the description and drawings should be regarded as illustrative rather than restrictive.

What is claimed is:

1. A method of diagnosing mild cognitive impairment (MCI) due to Alzheimer's disease (AD) comprising using a reagent to measure an amount of a diagnostic marker in a subject's blood sample, where the diagnostic marker is plasma miRNA that is a combination of: hsa-miR-1185-2-3p, hsa-miR-22-5p, hsa-miR-134-3p, hsa-miR-1909-3p and hsa-miR-107 and wherein the reagent is a combination of reverse transcription primers or probes comprising: SEQ ID No 6, SEQ ID No 4, SEQ ID No 2, SEQ ID No 5, and SEQ ID No 9, which bind with specificity to the plasma miRNA, respectively; and measuring an amount of hsa-miR-93-5p with a reverse transcription primer of SEQ ID No 1 as an internal control;

wherein the subject is diagnosed with mild cognitive impairment (MCI) due to Alzheimer's disease (AD) when the amount of each of hsa-miR-1185-2-3p, hsa-miR-22-5p, hsa-miR-134-3p, hsa-miR-1909-3p and hsa-miR-107 as determined from the subject's blood sample is lowered compared to a normal control subject.

2. The method according to claim 1, further comprising using a formula in a software package for data analysis for calculating expression levels of hsa-miR-1185-2-3p, hsa-miR-22-5p, hsa-miR-134-3p, hsa-miR-1909-3p, and hsa-miR-107, wherein the formula is:

$$\text{Logit}(p=MCI)=7.341-0.029\times hsa\text{-}miR\text{-}134\text{-}3p-0.150\times hsa\text{-}miR\text{-}22\text{-}5p-0.604\times hsa\text{-}miR\text{-}1185\text{-}2\text{-}3p-5.321\times hsa\text{-}miR\text{-}1909\text{-}3p-1.372\times hsa\text{-}miR\text{-}107.$$

3. A method of diagnosing mild cognitive impairment (MCI) due to Alzheimer's disease (AD), the method comprising:
(1) extracting total RNA from a patient's blood sample to be tested;
(2) using a miRNA reverse transcription kit to perform a reverse transcription reaction on the extracted total RNA to obtain corresponding cDNA, the miRNA reverse transcription kit comprising a set of reagents for measuring content of a diagnostic marker for MCI due to AD, wherein the diagnostic marker is plasma miRNA that is a combination of hsa-miR-1185-2-3p, hsa-miR-22-5p, hsa-miR-134-3p, hsa-miR-1909-3p, and hsa-miR-107, and wherein the set of reagents is a combination of reverse transcription primers or probes comprising: SEQ ID No 6, SEQ ID No 4, SEQ ID No 2, SEQ ID No 5, and SEQ ID No 9, which bind to the plasma miRNA, respectively;

(3) performing real-time fluorescent quantitative PCR with the cDNA with a reverse transcription primer of SEQ ID No 1, and using hsa-miR-93-5p as an internal control, where a detection result for each miRNA is expressed as ΔCt, wherein ΔCt=Ct miRNA-Ct hsa-miR-93-5p;

(4) processing the results obtained in step (3) using a formula as follows:

$$\text{Logit}(p=MCI)=7.341-0.029\times hsa\text{-}miR\text{-}134\text{-}3p-0.150\times hsa\text{-}miR\text{-}22\text{-}5p-0.604\times hsa\text{-}miR\text{-}1185\text{-}2\text{-}3p-5.321\times hsa\text{-}miR\text{-}1909\text{-}3p-1.372\times hsa\text{-}miR\text{-}107,$$

and performing ROC analysis on the value obtained by the formula, wherein an area under the curve approaching a value of 1 is predictive for the MCI due to AD.

* * * * *